Jan. 2, 1951

C. H. MILLER 2,536,690

FILTER

Filed April 12, 1946

INVENTOR.
Charles H. Miller
BY
Samuel Herrick

Jan. 2, 1951     C. H. MILLER     2,536,690
FILTER

Filed April 12, 1946                 3 Sheets-Sheet 2

INVENTOR.
Charles H. Miller
BY
Samuel Herrick

Jan. 2, 1951  C. H. MILLER  2,536,690
FILTER

Filed April 12, 1946  3 Sheets-Sheet 3

INVENTOR.
Charles H. Miller
BY
Samuel Herrick

Patented Jan. 2, 1951

2,536,690

UNITED STATES PATENT OFFICE 2,536,690

FILTER

Charles H. Miller, Chicago, Ill.

Application April 12, 1946, Serial No. 661,646

3 Claims. (Cl. 210—178)

This invention relates to filters and has for its object to provide a filter having a very large filtering capacity in proportion to its size and constructed in such manner that it may be kept in clean and operative condition with a minimum of labor and loss of time.

Further objects of the invention will be more specifically set forth in the detailed description which follows.

In the accompanying drawings.

Like numerals designate corresponding parts throughout the several figures of the drawings.

Figures 1, 3, 4:
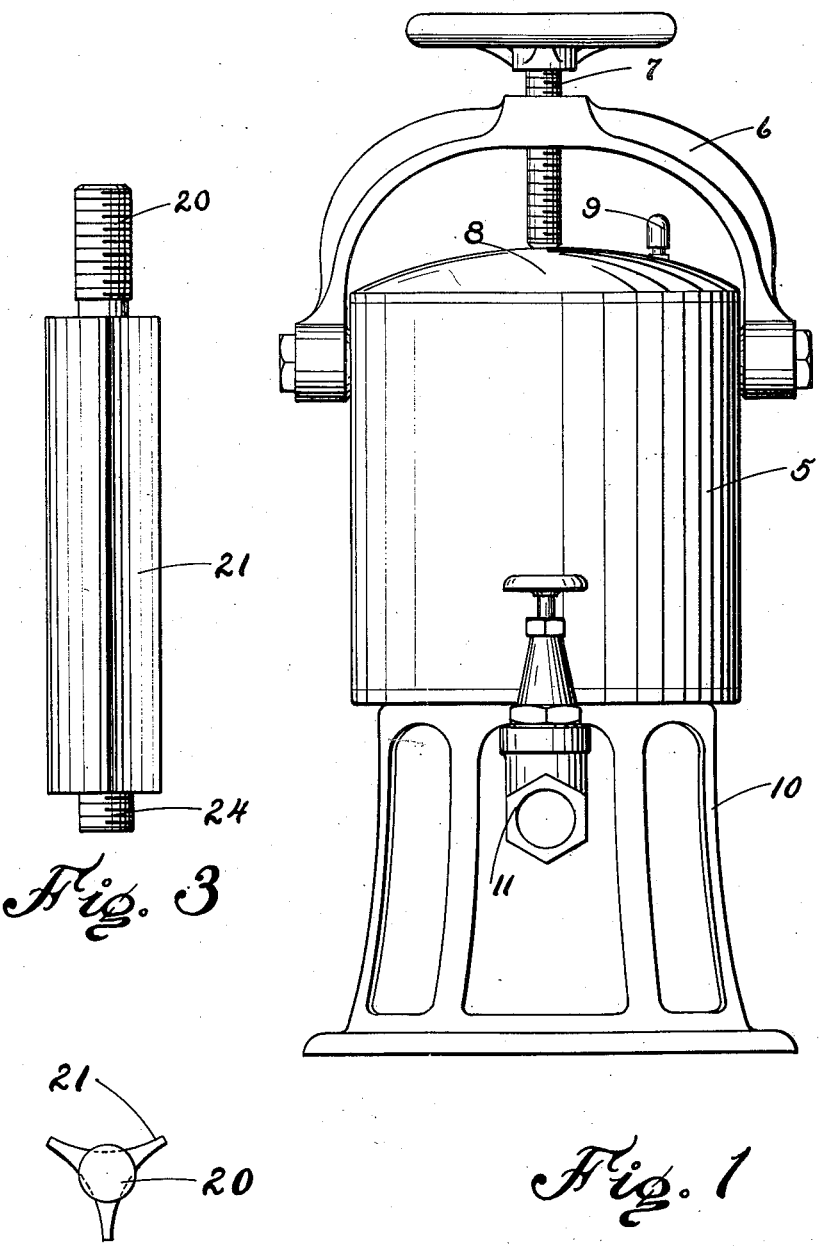
Figure 1 is a front elevation of a filter constructed in accordance with the invention.
Figure 3 is a detailed view of a post or pedestal by which the filter elements are tied together.
Figure 4 is a plan view of the structure of Figure 3.
Figure 2:
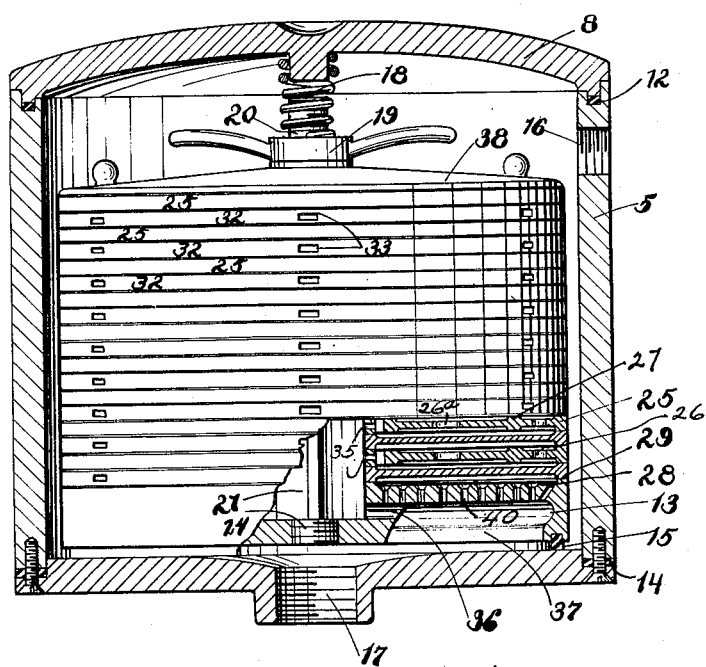
Figure 2 is a vertical sectional view of the filter casing with the internal operating parts shown partly in elevation and partly in section; with the screens and filter paper omitted.

The filter casing is indicated at 5, in Figures 1 and 2. A yoke 6 and clamping screw 7 provide means for clamping a cover 8 upon the casing. This cover may be provided with a pressure release valve 9. The casing may be provided with any suitable stand 10 and the outlet valve for the water is indicated at 11.

A gasket 12 is provided between the cover 8 and the casing 5 to form a fluid-tight joint. The filter element proper is mounted inside of the casing and its bottom assembly plate 13 is caused to make fluid-tight engagement with the bottom 14 of the casing through the medium of a gasket 15. The inlet for the water into the casing 5 is indicated at 16, and the presence of the gasket 15 prevents the passage of water directly from this inlet to the outlet 17 except through the filter or core assembly, presently to be described. It will be understood that the valve 11 is connected to the outlet 17. The core assembly as a whole is pressed upon the gasket 15 by a spring 18, said spring bearing between the head 8 of the casing and a clamping nut 19. This clamping nut engages the threaded portion 20 of the post or pedestal 21 of Figure 3. The lower portion of this pedestal is provided with a threaded extension 24 which screws into the bottom assembly plate 13. Mounted upon pedestal 21 are the filtering elements and the spacing members which lie between the filtering elements.

Figure 5:
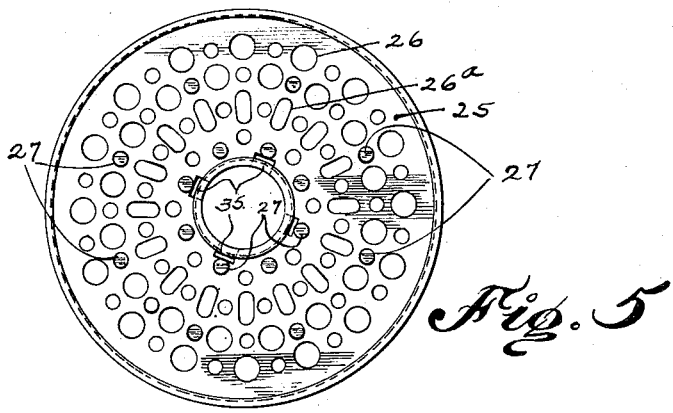
Figure 5 is a plan view of the disk of one of the double filtering elements.
Figure 6:
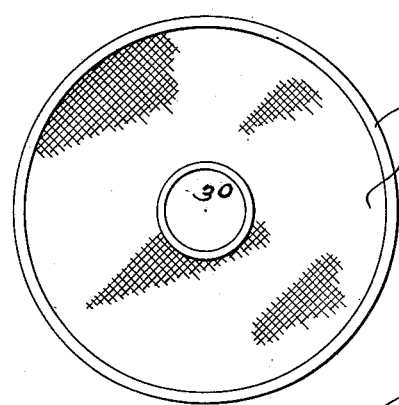
Figure 6 is a plan view of one of the filtering screens which lies upon the side of the filtering disk of Figure 5, in making up a filter element.
Figure 7:
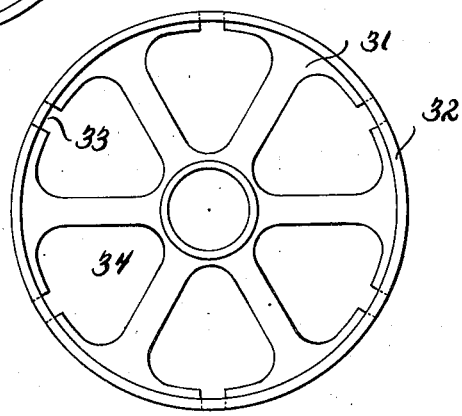
Figure 7 is a plan view of one of the spacer disks by which the filtering elements of Figures 5 and 6 are held in spaced relation to each other.
Figure 8:
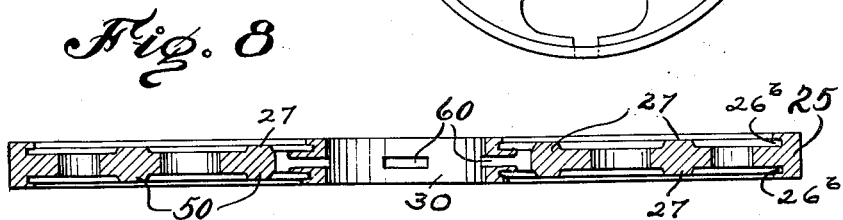
Figure 8 is a transverse sectional view of the filtering disk of Figure 5.
Figure 9:
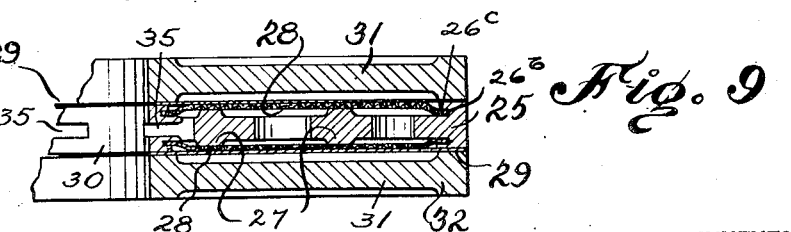
Figure 9 is a fragmentary magnified view in transverse section of one of the filtering elements which shows that each filter element is composed of the filtering disk of Figure 5, a filter screen like Figure 6, upon each side thereof, and a layer of filter paper upon each side thereof.

Each filtering element comprises a disk 25 (see Fig. 5). These disks have the openings 26, 26a formed therethrough and are provided with upstanding bosses 27. Spanning each face of each disk 25 is a fine, preferably bronze screen 28 (see Fig. 9) and disposed upon the outer face of each of said screens is a layer of filter paper 29. The disks are undercut at 26b to provide circumferential recesses into which the metallic rims 26c of the screens 28 are snapped. This avoids the necessity of providing screws to hold the screens in place. When the screens are snapped into place as described they are supported by the upstanding bosses 27. These several elements, to wit: the disks, the screens, and the filter paper together constitute a filtering unit and these units have central openings 30 through which the pedestal 21 passes. Disposed between the several filtering units are the water inlet spacer disks 31 illustrated in Figure 7. These disks comprise the peripheral flanges 32 which are pierced at intervals as indicated at 33 to permit water to pass through the water inlets or openings 33, into the openings 34 of the spacer disks, which openings of course lie between the filter units. Thus the passage of water is from 16 through 33 to 34, thence through the filter paper and screens of the filter disks 25. Some of the water passes through horizontal openings 35 to the central openings 30 of the filter units, and thence downwardly along the pedestal to the bottom of the filter (due to the fact that the pedestal is not circular in cross section and does not fill the central openings of the several filter units and spacing disks). Water also passes directly downward through the filtering units or elements through the openings 26, 26a, reaching the bottom of the casing 5 through openings 40. The water which passes downwardly around the pedestal passes through the transverse ports 36 into the space 37 constituting the hollow underside of assembly plate 13 beneath the filter assembly. By referring to Fig.

2 it will be seen that the bottom assembly plate 13 is of inverted cup shape, the openings 40 being formed through the top of this assembly plate. As stated the threaded extension 24 of the pedestal 21 screws into a part which is a portion of the bottom assembly plate. Also the port 36 is formed in this bottom assembly plate 13. Thus the filtrate which descends vertically through the openings 40 in the top of assembly plate 13 into the space 37 and thence to 17, while the filtrate which passes through openings 35 (Fig. 9) and thence downwardly along the pedestal, finds its way to space 37 and outlet 17 through the port 36 of the bottom assembly plate 13. By tightening down on clamping unit 19 the several filtering and spacing elements are drawn tightly together between the bottom assembly plate 13 and clamping disk 38. From there it passes to the water outlet 17. This double path for the water increases the filtering capacity far beyond any filter of which I have knowledge and is so efficient that a filter of comparatively small size will filter close to three thousand gallons per hour.

One of the filter paper and screen assemblies 29, 28 overlies openings 40 of the bottom assembly plate 13.

From the foregoing it will be seen that not only does the described arrangement of the filter paper, filter screens, and filter disks, in large number, provide means for filtering a large quantity of water rapidly, but the described assembly is such that by merely releasing the screw 7 and removing the cap 8, the whole filter assembly may be lifted out of the casing 5 and a clean one substituted, in an exceedingly short time. Thus no interruption of service is occasioned and the filtering process may proceed without substantial interruption.

The function of the clamping unit 19 is to bind all of the filter units and the spacer disks into firm and water-tight engagement with each other and upon the pedestal 21. When this clamp 19 is tightened it forces a stout clamping disk 38 forcibly upon the topmost filter unit. The presence of the filter paper acts as enough of a packing to insure a fluid-tight joint about the edges of all of the disks 25 and 32, thus in turn insuring that no water may find its way to outlet 17 except such as has been forced to pass through the filter paper and screens.

It is to be understood that the invention is not limited to the precise construction set forth but that it includes within its purview whatever changes fairly come within either the terms or the spirit of the appended claims.

Having described my invention, what I claim is:

1. A filter of the character described comprising a casing having a bottom the inner face of which presents a plane surface over those portions of the bottom adjacent the side walls of the casing, a cover for said casing, means for holding the cover upon the casing, a filtering assembly within the casing comprising a bottom assembly plate of inverted cup formation which provides a space in the bottom of the filtering assembly, an annular compressible gasket carried by the lower face of the assembly plate and bearing upon the plane bottom of said casing, said gasket providing a fluid tight barrier between the space within the bottom of the filtering assembly and the space within the casing outside of said gasket, a water inlet leading into the casing and into the space which lies outside of said gasket, a water outlet in the bottom of the casing and communicating with the space in the bottom of the filtering assembly, a post that is polygonal in cross section, the lower end of said post being rigidly engaged with the central portion of the bottom assembly plate, a plurality of alternating filter disks and hollow spacing members having central circular openings through which the post passes, the polygonal formation of the post causing it to present vertical passages along its sides, the spacing members having peripheral openings formed therein for the passage of water from the water inlet to the interiors of said spacing members, the filter disks carrying filtering medium upon their opposite faces, and having ports formed therein which establish communication between the spaces between the said screens of each filter disk and the vertical passages along the sides of the polygonal post, means having threaded engagement with the upper end of the post for binding the filter disks and spacing members upon the bottom assembly plate, and pressure exerting means between the cover and the filtering assembly for forcing the annular gasket into fluid tight engagement with the bottom of the casing, the bottom assembly plate being provided with ports leading from the space within its underside to the passages which extend vertically alongside the polygonal post.

2. A filter of the character described comprising a casing having a bottom the inner face of which presents a plane surface over those portions of the bottom adjacent the side walls of the casing, a cover for said casing, means for holding the cover upon the casing, a filtering assembly within the casing comprising a bottom assembly plate of inverted cup formation which provides a space in the bottom of the filtering assembly, an annular compressible gasket carried by the lower face of the assembly plate and bearing upon the plane bottom of said casing, said gasket providing a fluid tight barrier between the space within the bottom of the filtering assembly and the space within the casing outside of said gasket, a water inlet leading into the casing and into the space which lies outside of said gasket, a water outlet in the bottom of the casing and communicating with the space in the bottom of the filtering assembly, a post that is polygonal in cross section, the lower end of said post being rigidly engaged with the central portion of the bottom assembly plate, a plurality of alternating filter disks and hollow spacing members having central circular openings through which the post passes, the polygonal formation of the post causing it to present vertical passages along its sides, the spacing members having peripheral openings formed therein for the passage of water from the water inlet to the interiors of said spacing members, the filter disks carrying filtering medium upon their opposite faces, and having posts formed therein which establish communication between the spaces between the said screens of each filter disk and the vertical passages along the sides of the polygonal post, means having threaded engagement with the upper end of the post for binding the filter disks and spacing members upon the bottom assembly plate, and pressure exerting means between the cover and the filtering assembly for forcing the annular gasket into fluid tight engagement with the bottom of the casing, the bottom assembly plate being provided with ports leading from the space within its underside to the passages which extend vertically alongside the polygonal post, the bottom assembly plate also having a multiplicity of vertical openings formed therethrough, the upper face of said bottom assembly plate and said openings being covered by a filtering medium.

3. A structure as recited in claim 1 wherein the said filter discs are provided with a multiplicity of vertical openings through them which are in addition to the ports which lead to the vertical passages along the polygonal post.

CHARLES H. MILLER.

REFERENCES CITED

The following references are of record in the file of this patent:

UNITED STATES PATENTS

| Number | Name | Date |
| --- | --- | --- |
| 290,046 | Harris | Dec. 11, 1883 |
| 658,573 | Murphy | Sept. 25, 1900 |
| 824,487 | Klein | June 26, 1906 |
| 915,650 | Anderson | Mar. 16, 1909 |
| 1,223,299 | Taylor | Apr. 17, 1917 |
| 1,976,547 | Dumas | Oct. 9, 1934 |
| 1,977,174 | Crawford | Oct. 16, 1934 |
| 2,330,945 | Becker | Oct. 5, 1943 |
| 2,444,147 | Walton | June 29, 1948 |